July 14, 1936.  G. H. SMITH  2,047,750
FLUID PRESSURE RELIEF DEVICE
Filed Nov. 11, 1932  2 Sheets-Sheet 1

INVENTOR
George H. Smith
BY
Watson, Bristol, Johnson & Leavenworth
ATTORNEYS

July 14, 1936.  G. H. SMITH  2,047,750

FLUID PRESSURE RELIEF DEVICE

Filed Nov. 11, 1932  2 Sheets-Sheet 2

INVENTOR
George H. Smith
BY
Watson, Bristol, Johnson & Leavenworth
ATTORNEYS

Patented July 14, 1936

2,047,750

UNITED STATES PATENT OFFICE 2,047,750

FLUID PRESSURE RELIEF DEVICE

George H. Smith, Buffalo, N. Y., assignor, by mesne assignments, to Union Carbide and Carbon Corporation, a corporation of New York Application November 11, 1932, Serial No. 642,135

5 Claims. (Cl. 137—53)

This invention relates to a fluid pressure relief device and particularly to a relief valve which is hermetically sealed and has for its principal object to provide a device for preventing leakage of fluid when it is desired that the valve shall remain closed, for example when the pressure of the fluid is lower than the pressure at which the device is set to function.

Another object is to provide means for avoiding excessive loss of fluid after the device has functioned by stopping the flow when the pressure of the fluid is reduced by a desired amount.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

Figures 1, 4:
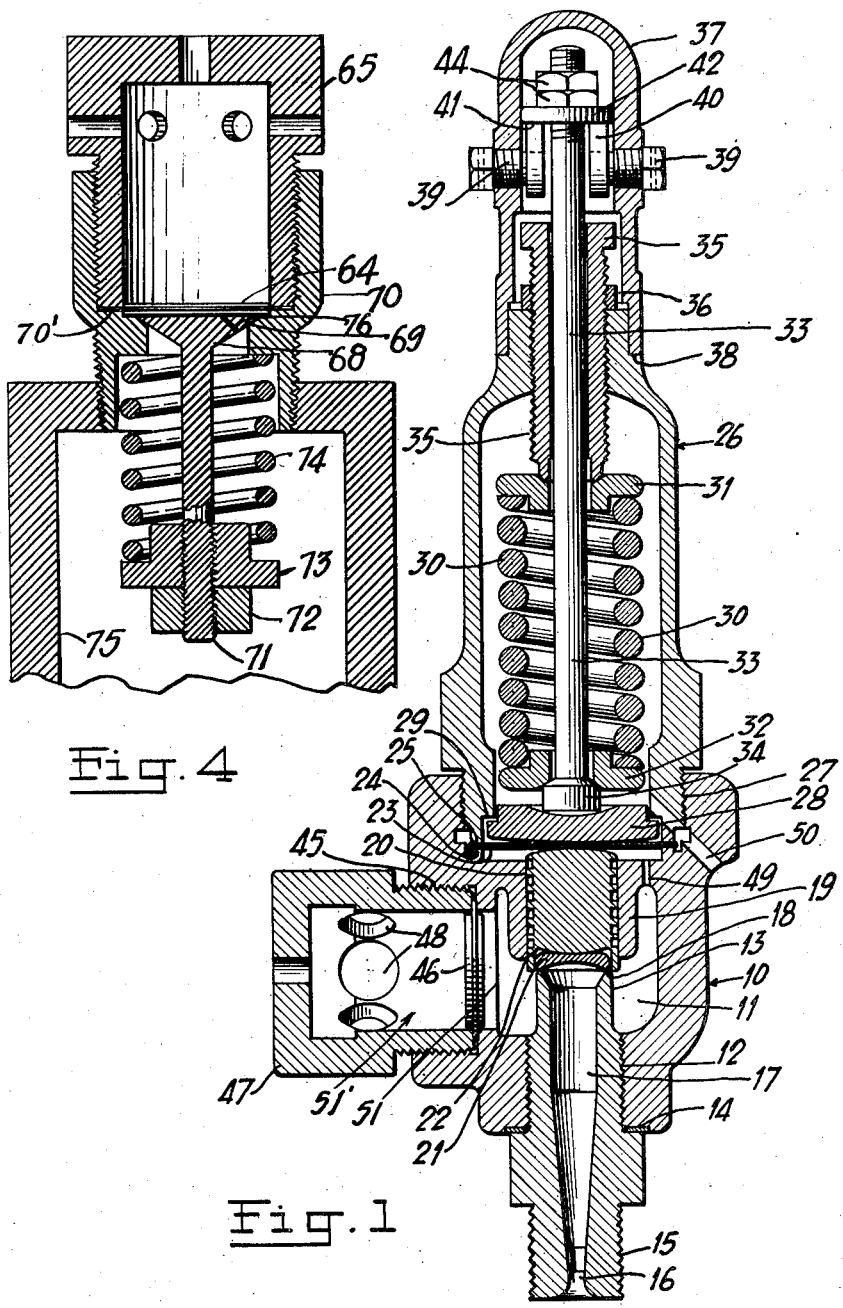
Fig. 1 is a view mainly in section showing a preferred form of apparatus constructed in accordance with the present invention.
Fig. 4 is a sectional view showing another modification.

Referring now to the drawings and particularly to Fig. 1, the present embodiment of the invention comprises a valve casing 10, containing a suitable gas chamber 11 having several threaded openings. An inlet nozzle 13 projects upwardly into chamber 11 and has threads engaging with the threads of opening 12 for pressing the shoulder of the nozzle 13 against the gasket 14 disposed between it and valve body 10, thereby sealing the joint against leakage. The external portion of nozzle 13 is provided with threads 15 adapted for coupling the valve to a conduit or directly to a fluid container. The passage through the nozzle 13 is shaped to have a constricted portion 16 near the external end and a tapered portion gradually expanding as it approaches the inner portion of the nozzle, where it joins a substantially parallel portion 17. The inner end of this passage flares out to form the relatively narrow valve seating edge 18.

The casing 10 is formed with a portion 19 depending into chamber 11 for guiding a reciprocable valve element holder 20 which holds the valve element 21 in operative position upon the seating edge 18. The plate holder 20 has circumferential grooves cut in its cylindrical surface to reduce the area of the friction surfaces and to provide spaces in which particles of grit or dirt may lodge, and is formed with a socket 22 at its lower end for receiving the element 21. The socket 22 has its edges turned inward to retain the element 21 and is arranged to press centrally on the element when the valve is closed. The upper end of the element holder 20 is slightly rounded to form a suitable contact surface for engagement with a diaphragm 23. The diaphragm 23 is preferably composed of several sheets of flexible metal to combine greater flexibility with desired strength and permanence. The sheets of the diaphragm are tightly held between a shoulder 24 of the body and a rim 25 of the spring housing 26 which has threads for engaging with those in the upper opening 27 of casing 10. Resting on top of the diaphragm and disposed to press it into central contact with plate holder 20, is diaphragm plate 28, which is prevented from rising too high by shoulders 29 of spring housing 26.

Figure 2:
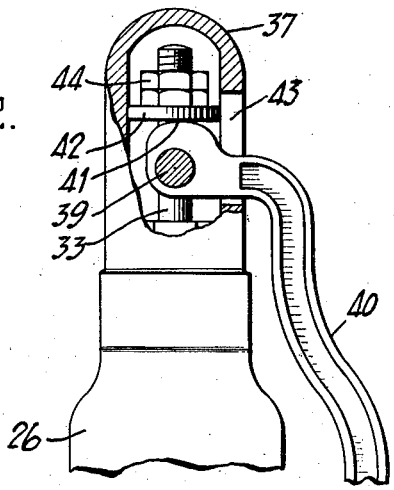
Fig. 2 is a fragmentary view showing details of a portion of the apparatus shown in Fig. 1.

Within the housing 26 is disposed a coil spring 30 held between spring retainers 31 and 32 encircling stem 33. An enlarged portion or head 34 of the lower end of stem 33 separates the lower spring retainer 32 from plate 28. The engaging surfaces of these parts are substantially spherical to permit the parts readily to center themselves and to equalize the pressure of the spring. The position of the upper retainer 31 is adjusted by hollow screw 35 which passes through in threaded engagement with the end of housing 26. The screw 35 is bored to permit the passage therethrough of stem 33. A jam-nut 36 is used to lock the position of screw 35. A cap member 37 is slipped over the end of housing 26, resting upon its shoulder 38, and forms a cover for the end of screw 35 and stem 33. The cap 37 is arranged to support pivot screws 39 in position to furnish a fulcrum for the stem lifting lever 40. As more clearly shown in Fig. 2, the lever 40 has cam-surfaces 41 for raising the washer 42 when the lever is operated. The lever handle portion extends outside of the cap 37 through slot 43. The fulcrum end of lever 40 is forked to provide clearance for the passage of stem 33 and to provide two fulcrum bearings and cam-surfaces. The end of stem 33 that passes through washer 42 is threaded and provided with lock nuts 44.

The side outlet 45 of chamber 11 is hermetically sealed by a frangible disk 46 which is conveniently held to its seat by a chambered discharge conveying member 47, which has threads engaging with the threaded portion of opening 45. The member 47 is provided with openings 48 whose combined area is such that a back pressure is created in the chamber 11 while the valve is discharging, which, together with the pressure under valve element 21, is sufficient to raise the diaphragm 23 against the force of spring 30 and thus hold the valve wide open for a desired discharge period. This period is determined by the rate of flow from the valve seat outwardly through the member 47, which rate in turn is controlled by the pressure gradient which obtains during the blow-off. An alternative and supplementary method of obtaining this back pressure in chamber 11 is to make the area of gas passages 51 or 51', or both, of a size that will create the desired back pressure.

The frangible disk 46 is of a character adapted to be ruptured by fluid pressure and is constructed with a thickened central portion and a rim of uniform reduced thickness for clamping between the body 10 and member 47. The thickness of this rim is adjusted so that the disk will rupture from internal pressure by substantially pure shearing action when the fluid pressure in chamber 11 reaches or exceeds a certain predetermined value.

In operation, the fluid pressure entering through nozzle 15 acts on the under surface of valve element 21, which has a larger area than the area of the restriction 16 in nozzle 13, but has a smaller area than the effective area of diaphragm 23. Any very slight leakage which may occur at seat 18 gradually permits the pressure to build up in chamber 11, which is otherwise hermetically sealed by diaphragm 23 and disk 46. If the fluid pressure in the container communicating with nozzle 13 continues to increase, the pressure in chamber 11 will increase until a pressure value is reached which will cause the disk 46 to be ruptured. However, before this release pressure is reached, the pressure will have acted on diaphragm 23, reaching the same through passage 49, raising it against the force of spring 30 acting through retainer 32, head 34, and plate 28. Thus at the time of release, the plate 28 is already raised by an amount limited by the position of the shoulder 29 and the fluid pressure has only to raise the element 21 and its holder 20 against the force of gravity. When the disk 46 ruptures, it is projected against the end of member 47 and the fluid passes to the atmosphere through holes 48. Immediately after release, a back pressure is created resulting from the rate of flow through the gas passages 51, 51' and holes 48 that is determined by the pressure gradient during blow-off, which acts on the effective area of diaphragm 23, to hold the spring compressed for a desired blow-off period, that is, until the pressure of the fluid source has been reduced a desired amount. When this occurs, the valve element 21 will be suddenly forced down on seat 18 to stop substantially all further flow. If the pressure of the fluid source again increases before the disk 46 is replaced, the valve will be opened by the action of the pressure on the effective area of the element 21 which pressure is preferably equal to the pressure that causes the disk 46 to rupture. If the pressure under element 21 exceeds a certain value which is a desired amount above the point at which element 21 begins to open, the rate of flow through chamber 11 will become large enough to produce sufficient back pressure on diaphragm 23 which, together with the pressure under element 21, will raise plate 28 against shoulder 29, permitting thereafter a very rapid discharge of fluid, until the pressure entering 16 is reduced to the desired point, at which point element 21 will close off the flow. The areas of the outlet restrictions and the effective areas of element 21 and diaphragm 23 are so chosen in relation to each other that the pressure at which the valve reseats is a desired amount below the pressure at which the valve releases. Once member 28 is against shoulder 29, the rate of flow, and consequently the back pressure in chamber 11, is so large as to prevent element 21 from re-seating. Nozzle 16 then restricts the flow to such an extent that the pressure under element 21 is substantially less than the pressure entering nozzle 16. This decrease causes the pressure under element 21 to approach the value of the high back pressure in chamber 11, and by proper proportioning openings 16 and 48, the element 21 will close when the pressure at the entrance point to nozzle 16 is at a desired value.

The lever 40 is operated when it is desired to test the valve. When the lever is pulled, the cam-surfaces 41 lift the washer 42 which draws the stem 33 upward and as the retainer 32 rests on head 34 of the stem, the spring is compressed. The chamber within housing 26 is vented to atmosphere by means of a passage 50.

Figure 3:
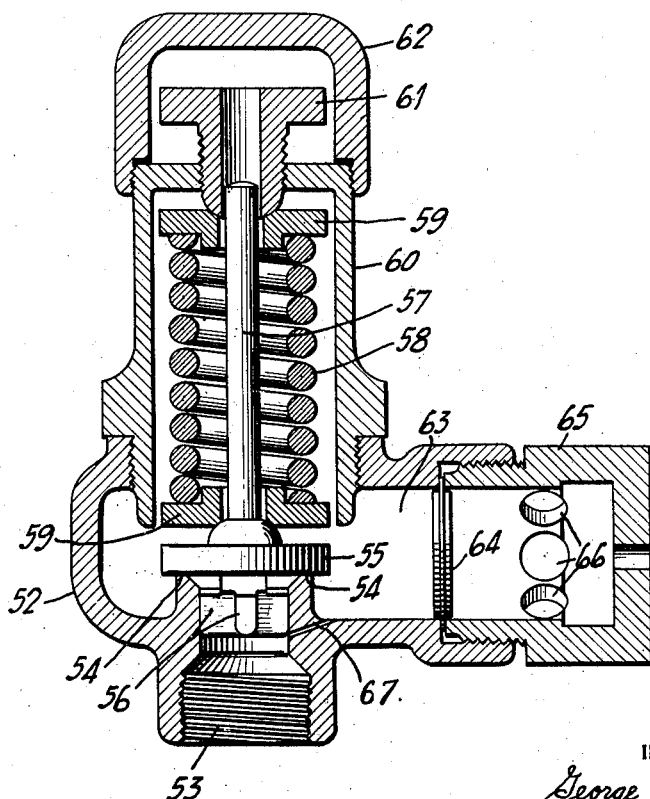
Fig. 3 is a sectional view showing a modified form of the invention; and—

The form of the invention illustrated by Fig. 3 shows another means for limiting the discharge of fluid in combination with a frangible disk. Here the casing 52 is provided with an inlet channel 53 ending in a valve seat 54 adapted to engage the seating element 55 provided with fins 56 and a stem 57 engaging suitable surfaces for guiding the movement of the valve element. A closing force is applied to the element 55 by coil spring 58 held in compression between spring retainers 59 within spring housing 60. The spring is adjusted by screw 61 threadedly engaging the end of the housing 60. Leakage of fluid at the end of housing 60 is prevented by a cap 62 which makes a gas tight joint with housing 60. The casing 52 is provided with a discharge passage 63 which is sealed by a frangible disk 64 that is similar to the frangible disk 46 shown in Fig. 1. The disk is held by chambered member 65 which is provided with fluid discharge ports 66. A leakage port 67 of small capacity is provided to permit the pressure in the container which is being protected to act on the frangible disk 64.

In operation fluid pressure enters at 53 and passes through the leakage port 67 so that fluid pressure builds up within casing 52. The pressure, when of an excessive value, acts against disk 64, bursts it and drives the central portion of disk 64 to the end of the holder chamber whence the valve will open wide and permit the discharge of fluid at a relatively rapid rate through ports 66. The discharge will continue until the pressure at the inlet 53 has reduced to a value whereby its force on the area of the valve element 55 exposed to the pressure is insufficient to overcome the spring force.

When the increase of excessive pressure in the container which communicates with the device is very sudden, the pressure against the disk 64 may not increase fast enough to burst it in time to prevent the excessive pressure in the container reaching too high a value. This lag is caused by the relative largeness of the chamber within casing 52 compared to the rate of flow through the leakage port 67. This lag may be reduced to a very small value by decreasing the volume of the chamber included between the valve and the frangible disk.

Fig. 4 illustrates a construction in which this time lag is very small. Here the frangible disk 64 is disposed directly above the valve element 68 so that a chamber of relatively very small volume is included between them. The valve element 68 engages with seat 69 formed on the body 70. The body 70 has a shoulder 70' for supporting disk 64 which hermetically seals the valve. The disk is held to the shoulder by member 65. The under side of the valve 68 is provided with a stem portion 71 having threads at its end for carrying a lock nut 72 and spring retainer 73. The spring 74, disposed between the retainer 73 and a spring seat of the body 70 holds the valve 68 yieldably closed against pressure acting on its under side. The lower portion of body 70 surrounding the spring is provided with external threads for engaging with a threaded opening in a portion 75 of the container being protected. Pressure communication between the container 75 and the chamber between valve 68 and disk 64 is provided by a narrow passage 76 through the valve 68. This passage is large enough to permit the chamber above the valve to contain a fluid having a pressure which remains relatively close to the value of the pressure in the container 75 and yet small enough to limit the leakage of fluid to a value that will permit the frangible disk to be replaced while a fluid pressure exists under the valve.

It has been found that the ordinary relief valves available usually leak slightly at pressures lower than the releasing pressure after they have once been operated. When the fluids stored in containers to be protected are of a valuable kind, for example, oxygen, it is particularly desirable to avoid such leakage. On the other hand, if the container is protected by a frangible disk alone, the whole contents of the container is usually lost when the disk ruptures. The apparatus of the present invention avoids the undesired losses by providing a relief valve which is hermetically sealed by a frangible disk. After the disk has ruptured, the valve will permit only enough fluid to be discharged to cause the pressure to be reduced by a desired amount, and when the valve closes, the leakage which may occur is very small and will not be great enough to offer any difficulty in replacing the ruptured disk with a new frangible disk, so that the valve may be again hermetically sealed without removing it from communication with the container.

The valve arrangements shown exhaust to the atmosphere since, where the gas material stored in the container is oxygen, there is no noxious or undesirable effect produced upon the atmosphere. It is contemplated, however, that, where the gas material is of a different character or has a noxious effect on the atmosphere, the discharge outlet of the relief valve will be constructed in such a manner that the gases discharged upon rupture of the frangible disk will be conveyed away and vented outdoors or other safe place. In such case, the discharge outlet may be in the form of an elongated passage which may be provided either in the initial design of the relief valve or by adding an adapter to a discharge outlet of the forms illustrated.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a fluid pressure relief valve, the combination with a casing forming a chamber having an outlet and an inlet adapted to communicate with a source of supply and provided with a valve seat at its end within the chamber, of a valve element within said chamber seating on said valve seat, means associated with said casing for controlling the unseating of said valve element, means for building pressure in said chamber to a value substantially equal to that of the source of supply by a positive admission of fluid to said chamber from said source preparatory to blow-off, a replaceable frangible disk having a relatively thick central portion for sealing said outlet and disposed so as to be ruptured by shearing action initiated by a predetermined pressure in said chamber that is in excess of a pressure sufficient to lift said valve element from its seat, and means for clamping said frangible disk in sealing position at the outlet of said casing.

2. In a fluid pressure relief valve, the combination with a casing forming a chamber having an outlet and an inlet provided with a nozzle of relatively restricted opening communicating with the chamber and constructed to have a valve seat at its end within the chamber, said outlet being of greater area than said restricted nozzle opening and positioned relative to said valve seat to provide during blow-off a relatively steep pressure gradient outwardly from said valve seat, of a valve element within said chamber seating on said valve seat, means associated with said casing for controlling the unseating of said valve element and determining the pressure at which fluid is admitted into said chamber during blow-off, a replaceable frangible disk having a thickened central portion sealing the outlet of said casing and disposed so as to be ruptured by shearing action initiated by a predetermined pressure in said chamber arising in excess of a pressure sufficient to lift said valve element from its seat, and means associated with the casing outlet and projecting away from the casing and provided with a discharge remote from said casing of total area greater than the area of said casing outlet whereby to reduce the steepness of said gradient a limited amount at the inception of discharge to create a back pressure in said chamber during discharge of predetermined value which is sufficient to hold said valve element fully open during a desired period of discharge.

3. In a fluid pressure relief valve, the combination with a casing forming a chamber having an outlet and an inlet provided with a nozzle of relatively restricted opening projecting into the chamber and constructed to have a valve seat at its end within the chamber, said outlet being of greater area than said restricted nozzle opening and positioned relative to said valve seat to provide during blow-off a relatively steep pressure gradient outwardly from said valve seat, of a valve element within said chamber seating on said valve seat, means associated with said casing for controlling the unseating of said valve element and determining the pressure at which fluid is admitted into said chamber during blow-off, a replaceable frangible disk having a thickened central portion sealing the outlet of said casing and disposed so as to be ruptured by shearing action initiated by a predetermined pressure in said chamber arising in excess of a pressure sufficient to lift said valve element from its seat, and a discharge conveying member disposed over said outlet for receiving the discharge and having a plurality of discharge openings of total area greater than the area of said casing outlet and arranged to convey the discharge to a point at a distance from said casing such as to reduce the steepness of said gradient a desired amount at the inception of discharge to create a back pressure in said chamber during discharge of predetermined value which is sufficient to hold the valve element fully open during a desired period of discharge.

4. In a fluid pressure relief valve, the combination with a casing forming a chamber having an outlet and an inlet provided with a nozzle of relatively restricted opening projecting into the chamber and constructed to have a valve seat at its end within the chamber, said outlet being of greater area than said restricted nozzle opening positioned relative to said valve seat to provide during blow-off a relatively steep pressure gradient outwardly from said valve seat, of a valve element within said chamber seating on said valve seat, a flexible diaphragm comprising a wall of said chamber and subject to the pressure therein and arranged to control the unseating of said valve element, said diaphragm having an effective area greater than the area of said valve element upon which the fluid pressure in said nozzle acts, spring means reacting against said diaphragm on the exterior of said casing, interior means causing the unseating of said valve element by a predetermined pressure differential reacting against said spring means, a replaceable frangible disk having a thickened central portion sealing the outlet of said casing and disposed so as to be ruptured by shearing action initiated by a predetermined pressure in said chamber arising in excess of the pressure which lifts said valve element from its seat, and means associated with the casing outlet and projecting away from the casing and provided with a discharge remote from said casing of total area greater than the area of said casing outlet whereby to reduce the steepness of said gradient a limited amount at the inception of discharge to create a back pressure in said chamber during discharge of predetermined value which is sufficient to hold said valve element fully open during a desired period of discharge.

5. In a fluid pressure relief valve, the combination with a casing forming a chamber having an outlet and an inlet provided with a nozzle of relatively restricted opening projecting into the chamber and constructed to have a valve seat at its end within the chamber, said outlet being of greater area than said restricted nozzle opening positioned relative to said valve seat to provide during blow-off a relatively steep pressure gradient outwardly from said valve seat, of a valve element within said chamber seating on said valve seat, a flexible diaphragm comprising a wall of said chamber and arranged to control the unseating of said valve element, said diaphragm having an effective area exposed to pressure in said chamber greater than the area of said valve element upon which the pressure in said nozzle acts, spring means on the outside of said casing reacting at one end against said diaphragm, adjusting means associated with the other end of said spring means whereby the force transmitted to said diaphragm may be varied, a replaceable frangible disk having a thickened central portion sealing the outlet of said casing and disposed so as to be ruptured by shearing action initiated by a predetermined pressure in said chamber arising in excess of a pressure sufficient to lift said valve element from its seat, and a discharge conveying member disposed over said outlet for receiving the discharge and having a plurality of discharge openings of total area greater than the area of said casing outlet and arranged to convey the discharge to a point at a distance from said casing such as to reduce the steepness of said gradient a desired amount at the inception of discharge to create a back pressure in said chamber during discharge of predetermined value which is sufficient to hold the valve element fully open during a desired period of discharge.

GEORGE H. SMITH.